United States Patent
Ikarashi et al.

(10) Patent No.: US 6,276,751 B1
(45) Date of Patent: Aug. 21, 2001

(54) SPORT UTILITY TRUCK INTERLOCKS

(75) Inventors: Yoshiski Ikarashi, West Bloomfield, MI (US); Masazomi Miyagawa, Naka-ku (JP)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 09/525,053

(22) Filed: Mar. 14, 2000

(51) Int. Cl.$^7$ ........................................ B60N 2/00
(52) U.S. Cl. .............. 296/190.11; 296/68; 296/146.1; 296/183
(58) Field of Search ................. 296/190.11, 68, 296/67, 146.1, 183

(56) References Cited

U.S. PATENT DOCUMENTS 3,741,605 * 6/1973 Lee .......................................... 296/10
4,366,978 * 1/1983 Kamatani ................................ 296/68
4,480,868 * 11/1984 Koto .................................. 296/190.11

* cited by examiner

*Primary Examiner*—D. Glenn Dayoan
*Assistant Examiner*—Lori L. Coletta
(74) *Attorney, Agent, or Firm*—Foley & Lardner

(57) ABSTRACT

A vehicle has a cab with a front seat and a rear seat; a cargo area behind the cab; a back door between the cab and the cargo area; and a first interlock which prevents the back door from being opened when the rear seat is in a seating position.

The vehicle may also include a second interlock which prevents the rear seat from being placed in the seating position while the back door is opened.

The first interlock may include a back door lock which locks the back door when the rear seat is in a seating position. The second interlock may include a seat lock which locks the rear seat in a non-seating position when the back door is opened.

8 Claims, 8 Drawing Sheets

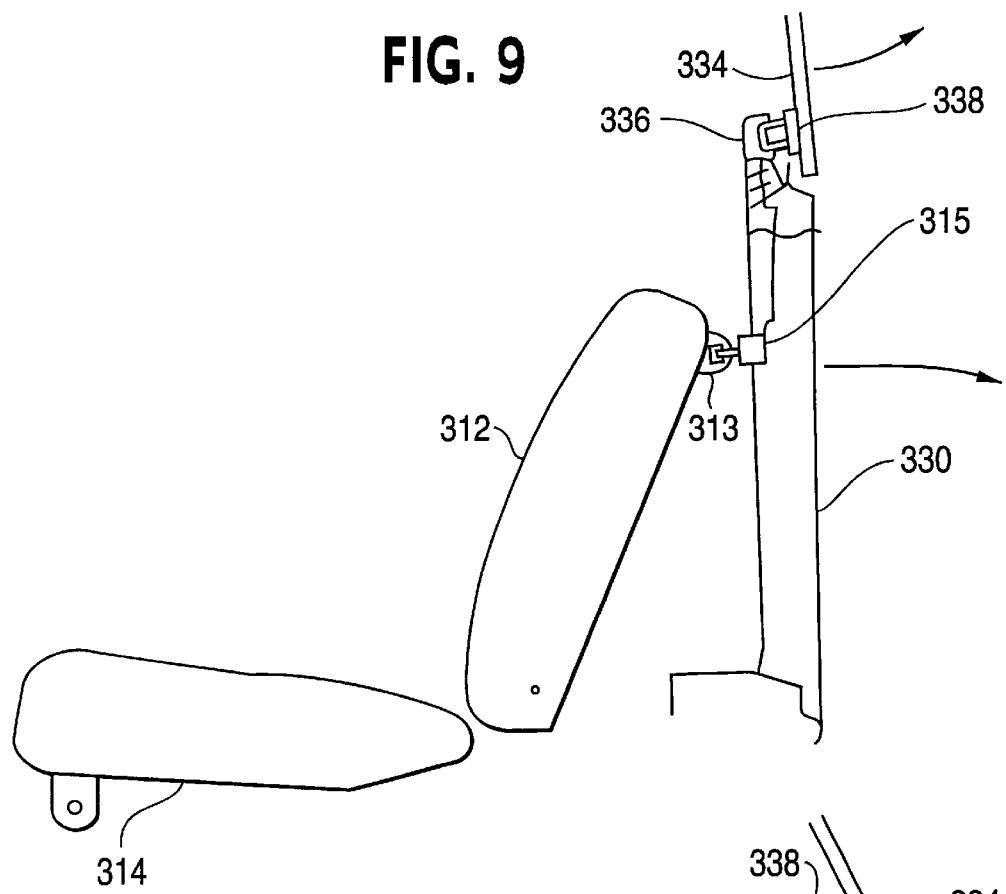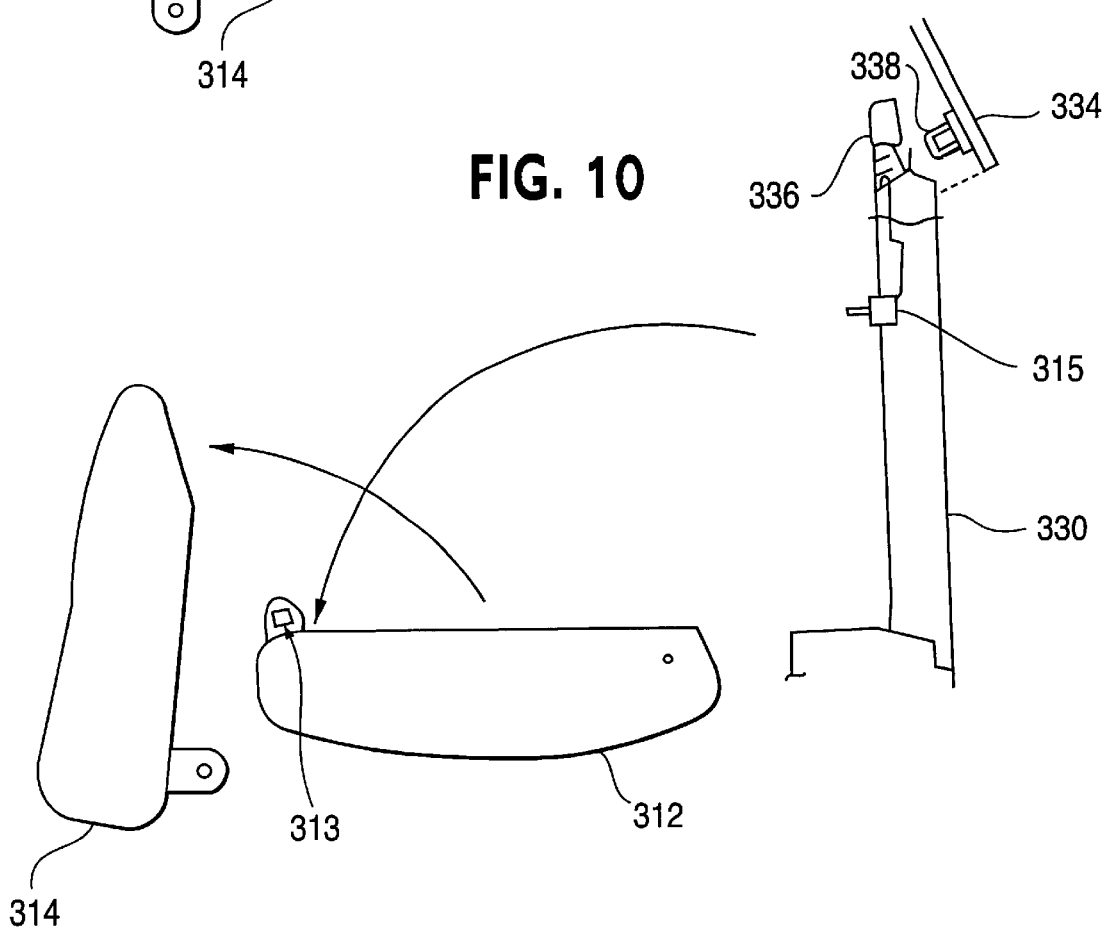

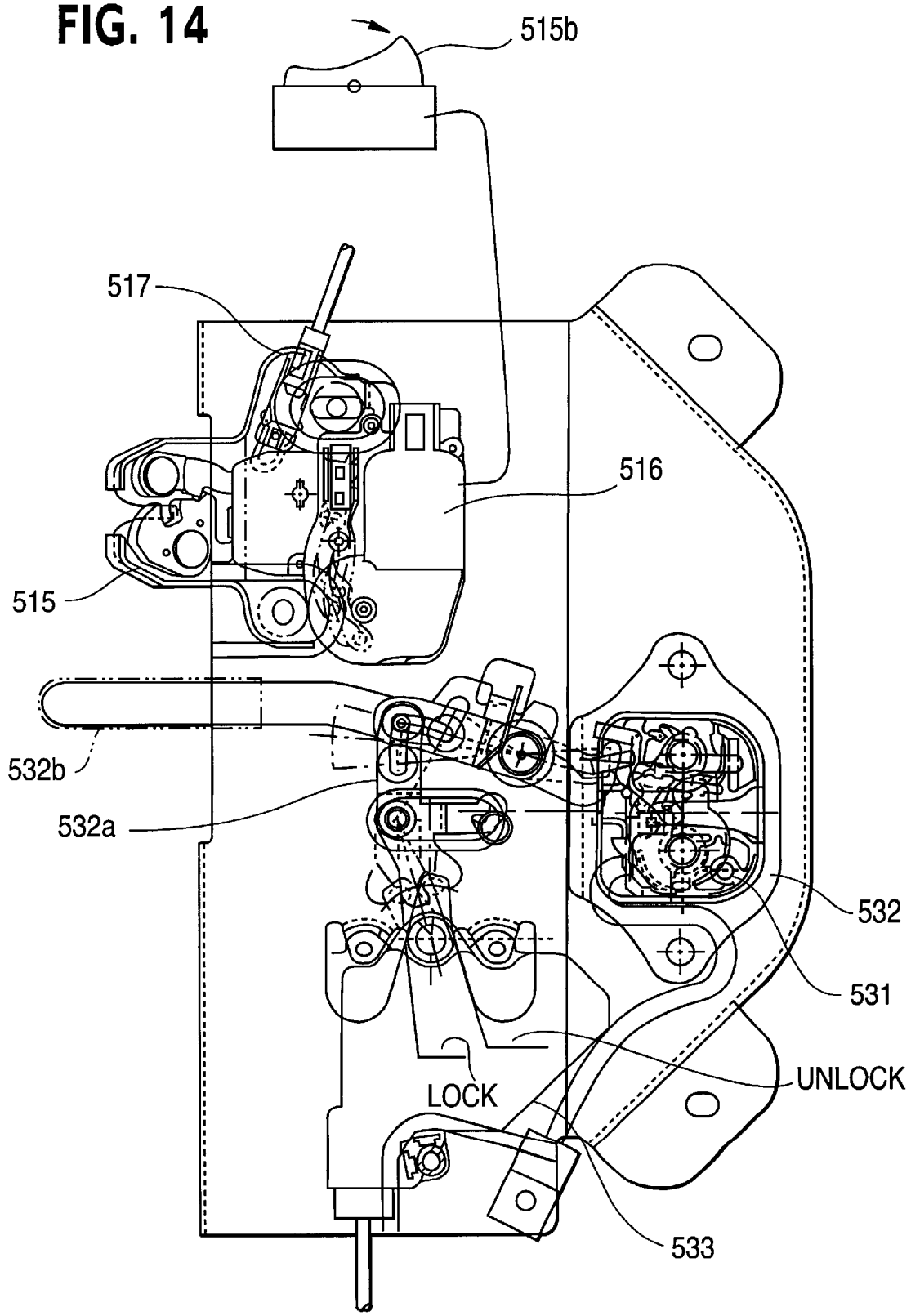

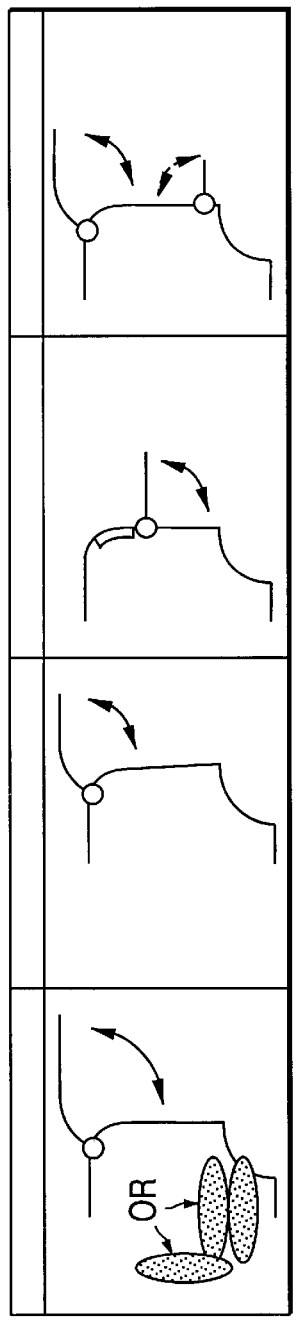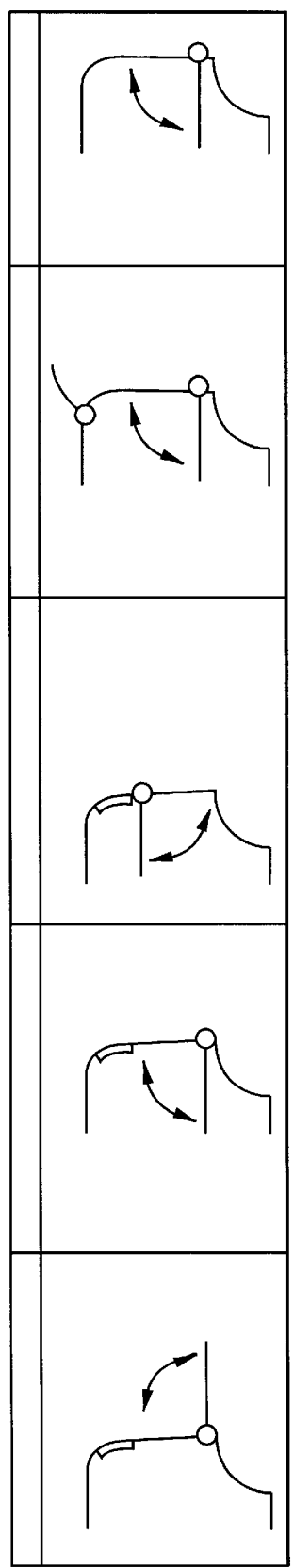

SPORT UTILITY TRUCK INTERLOCKS

BACKGROUND OF THE INVENTION

The invention relates to pick-up type trucks, such as sport utility trucks (SUTs). More specifically, the invention is directed to interlocks for such trucks.

Current commercially-available pick-up type trucks do not have a back door between the passenger compartment (or cab) and the cargo area (or bed). If a pick-up truck is provided with a rear seat and a back door, the truck can accommodate longer objects when the back door is open and the rear seat is stowed out of the way. Such a design is shown in FIGS. 1 and 2. FIG. 1 shows a SUT 100, with a cab 110, a cargo bed 120, and a back door 130. FIG. 2 shows SUT 100 with the back door 130 held open by a stay(s) 140. A similar design is shown in the *International Automobile Manufactures Update*, Vol. 10, No. 8 (August 1999).

SUMMARY OF THE INVENTION

It is an object of the invention to provide an improved pick-up type truck. It is another object of the invention to more safely provide more cargo space for a pick-up type truck.

According to a first aspect of the invention, there is provided a vehicle having a cab with a front seat and a rear seat; a cargo area behind the cab; a back door between the cab and the cargo area; and a first interlock which prevents the back door from being opened when the rear seat is in a seating position.

The vehicle may also include a second interlock which prevents the rear seat from being placed in the seating position while the back door can be opened.

The first interlock may include a back door lock which locks the back door when the rear seat is in a seating position. The second interlock may include a seat lock which locks the rear seat in a non-seating position when the back door can be opened.

DESCRIPTION OF THE DRAWINGS

FIGS. 9 and 10 illustrate a second embodiment of the invention;

FIG. 14 illustrates a fourth embodiment of the invention; and

FIGS. 15A to 15I show numerous variations of the invention.

DETAILED DESCRIPTION OF PREFERRED EMBODIMENTS

Figure 1:
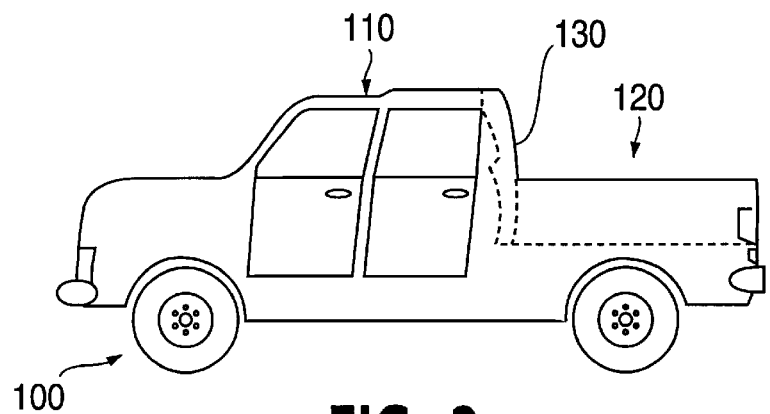
FIG. 1 shows a SUT having a back door, with the back door being in a closed position.
Figure 2:
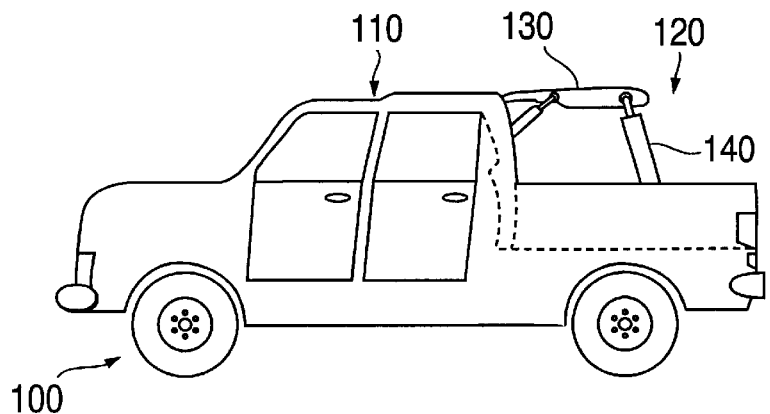
FIG. 2 shows a SUT having a back door, with the back door being in the open position.
Figure 5:
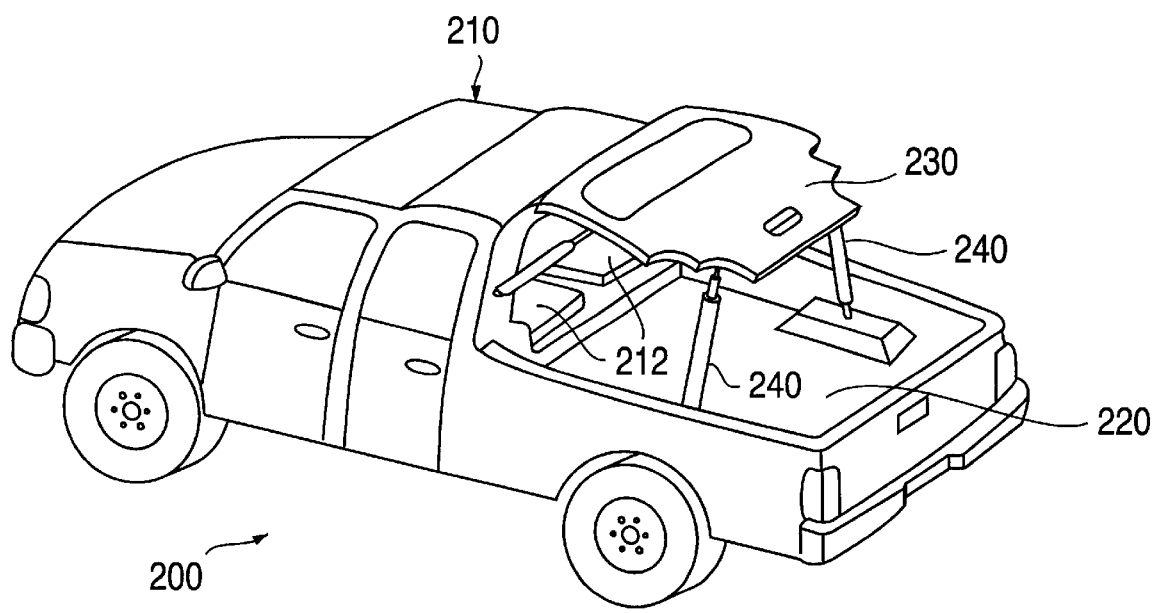
FIG. 5 is a perspective view of the vehicle of FIG. 4.
Figure 3:
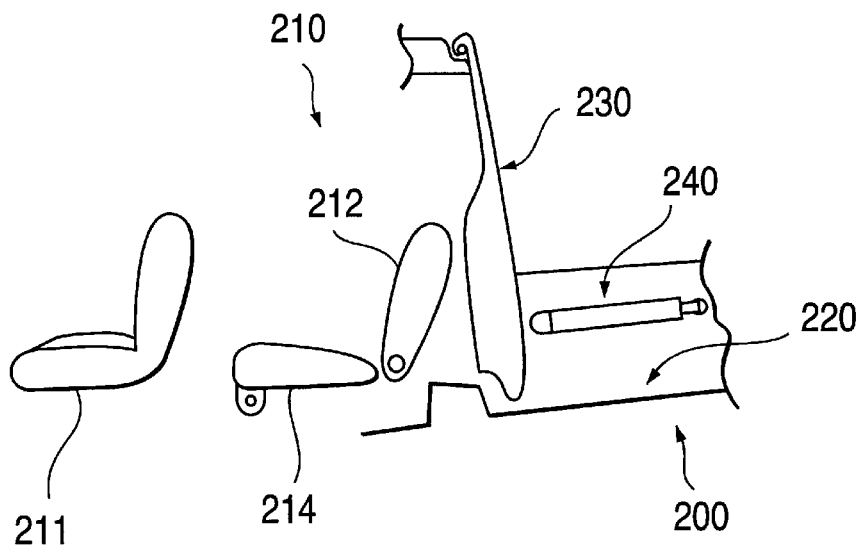
FIGS. 3 and 4 show a cab and a cargo bed of a SUT, with a back door closed and opened, respectively.
Figure 4:
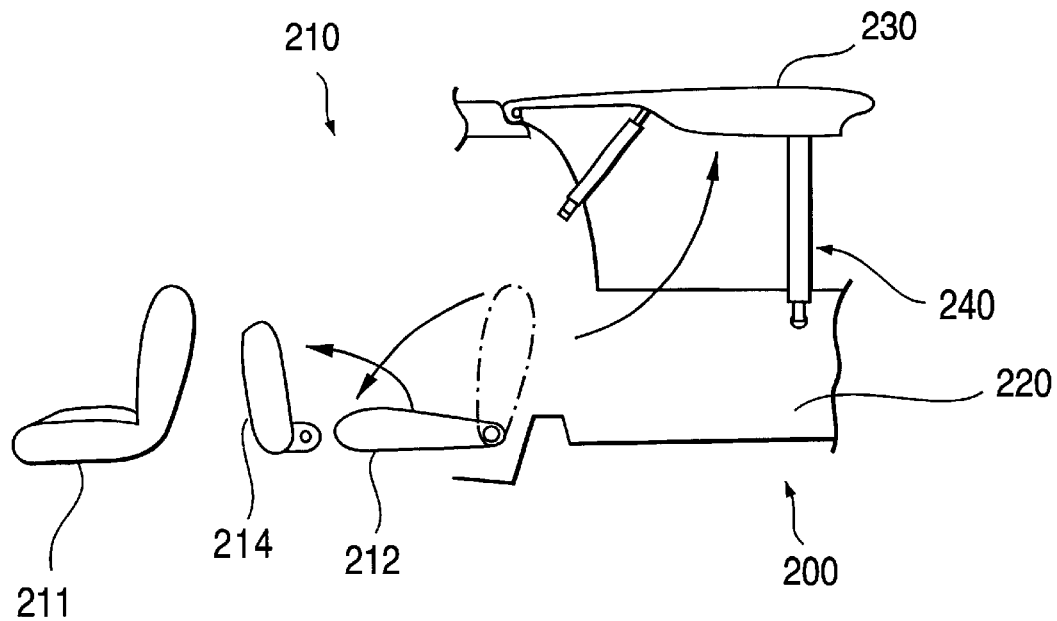

FIGS. 3 and 4 show a portion of a cab 210 and cargo bed 220 for a vehicle 200. FIG. 3 shows cab 210 having a front seat 211, and a rear seat bottom 214 and a rear seat back 212 in a seating position. In FIG. 3, a back door 230 is in the closed position and a back door stay(s) 240 is in the stowed position. FIG. 4 shows the same vehicle with the back door 230 open and supported by stay(s) 240. The stay(s) 240 can support the back door when the vehicle is running. In FIG. 4, the rear seat bottom and the rear seat back are in a non-seating position. In more detail, when the back door opens, the rear seat bottom 214 can be in a pushed forward position and the rear seat back can be in a pushed down position so that it lies flat. Such an arrangement allows the space normally occupied by the rear seat to be used as cargo space (as an extension of the cargo bed). FIG. 5 shows an overall perspective view of this arrangement.

In a design such as depicted in these figures, if the back door were open and someone was seated on the rear seat at the same time, it is possible that an occupant may be subject to being hit by an object loaded in the cargo bed or by the back door (if the back door suddenly closed).

The present invention provides safety features which prevent someone from sitting on a rear seat with the back door open. As will be described in more detail below, the present invention provides an interlock which requires that the rear seat be out of its normal seating position and that the rear seat be in a condition where nobody can be seated before the back door can be released. Also, the present invention provides an interlock such that the rear seat can be placed into the normal seating position only when the back door is closed. Thus, the invention ensures that the back door is closed when someone can sit on the rear seat. On the other hand, when the rear seat is in a non-seating position, the back door can be opened and long objects (such as a mattress or long chair) can be carried.

Figure 6:
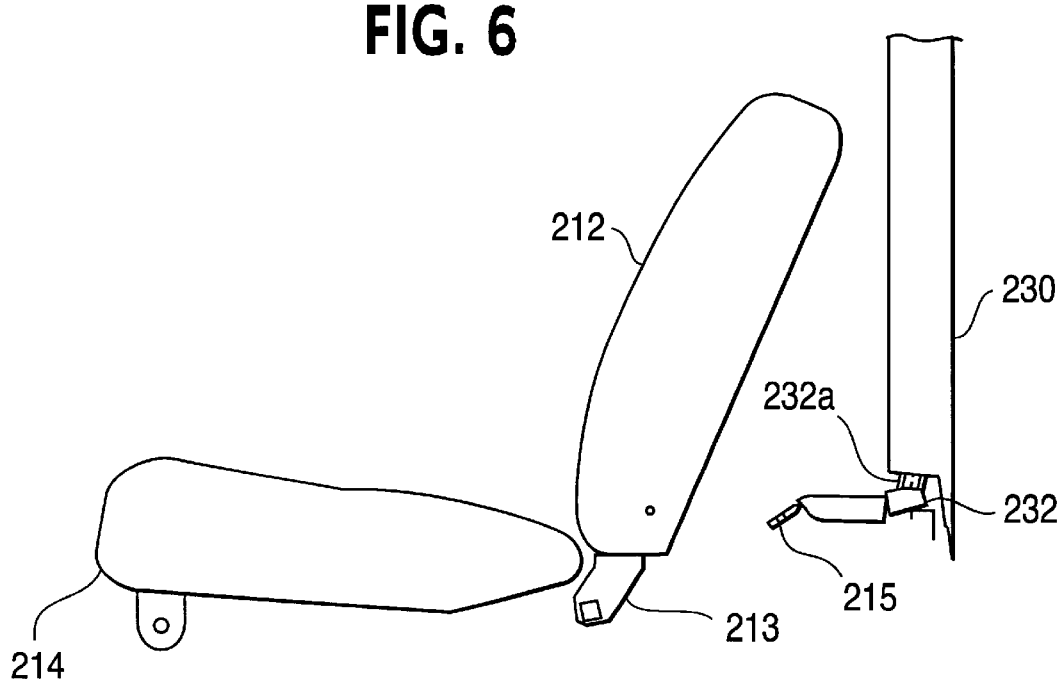
FIGS. 6 to 8 illustrate a first embodiment of the invention.
Figure 7:
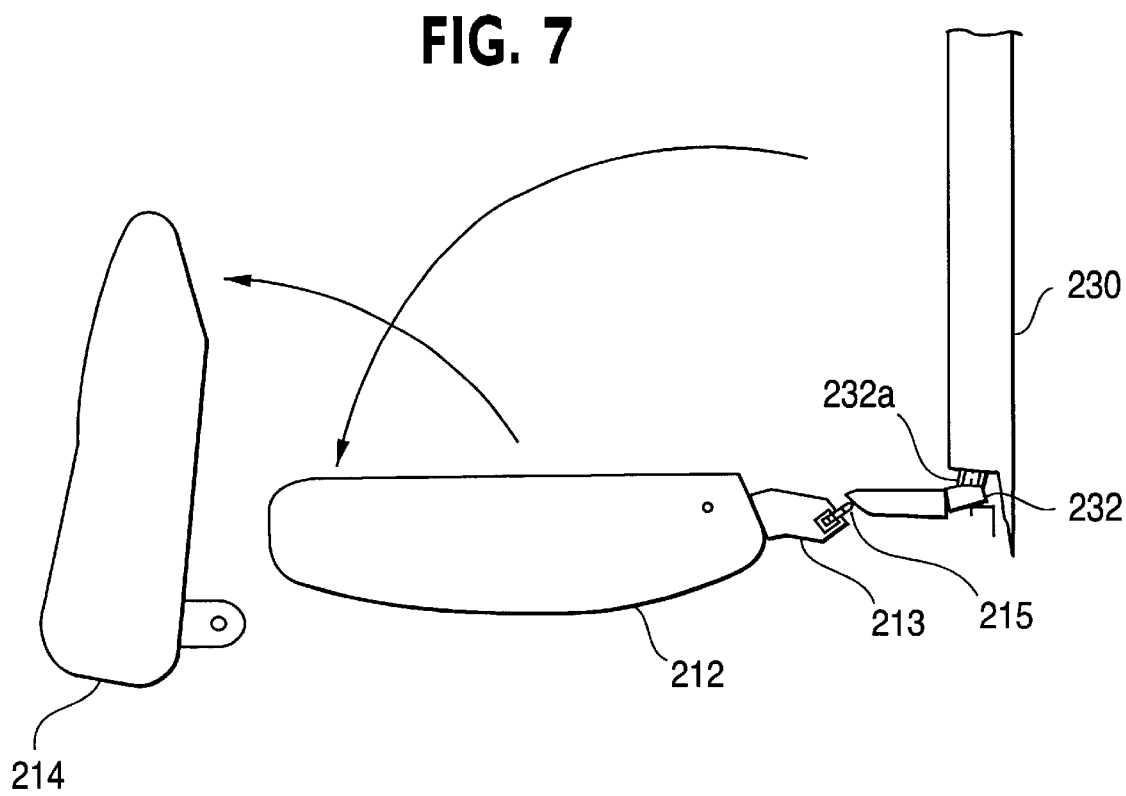
Figure 8:
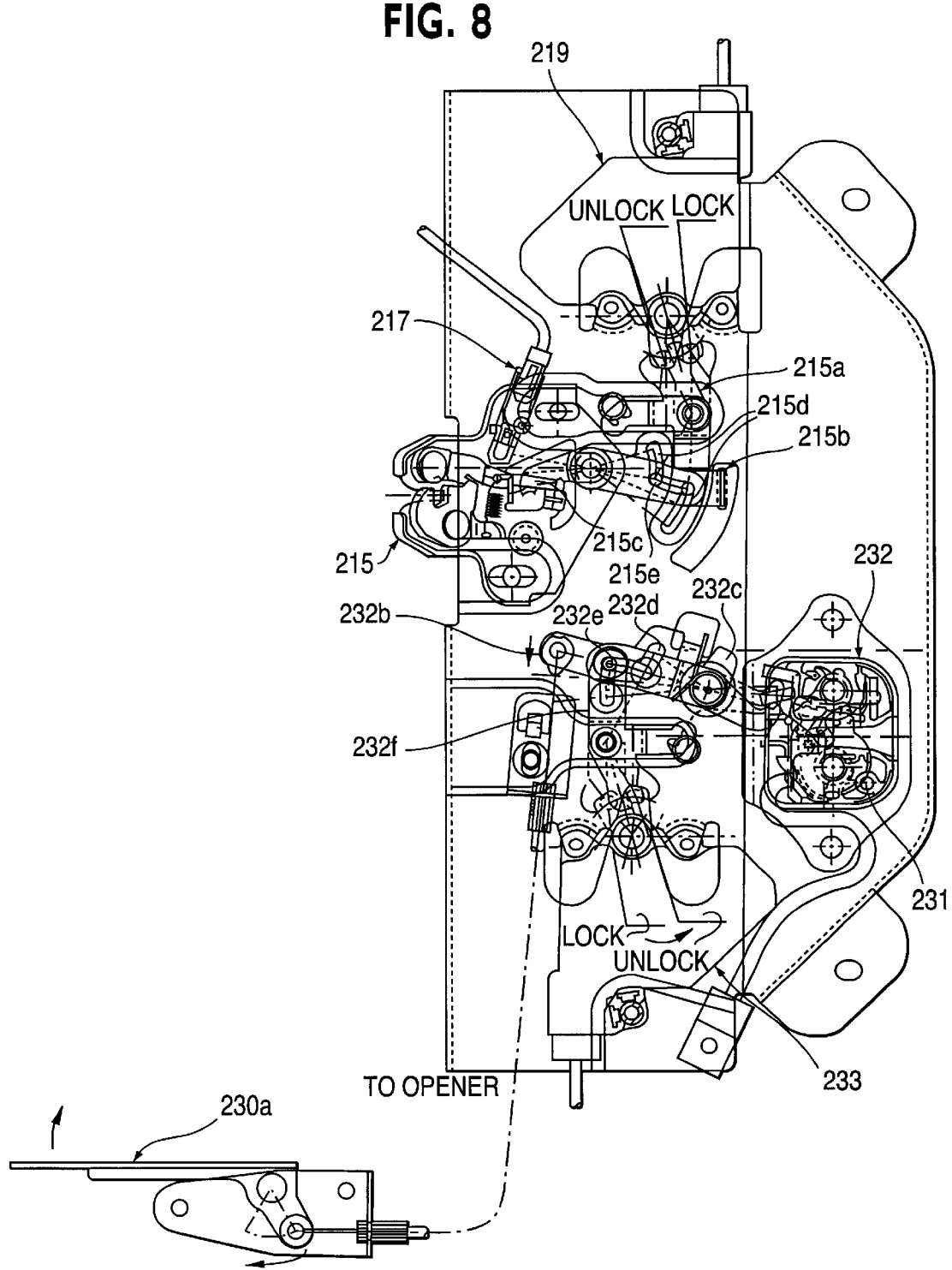

FIGS. 6 to 8 illustrate one embodiment of the invention.

FIG. 6 shows a rear seat back 212 and a rear seat bottom 214. The rear seat back 212 is equipped with a striker 213.

A seat lock 215 is located behind the rear seat. A back door lock 232 is located on the body side underneath back door 230. The back door lock engages a back door striker 232*a* on the back door. FIG. 7 shows the arrangement when rear seat bottom 214 is lifted up and moved forward and rear seat back 212 is folded down. When this happens, the rear seat lock 215 grips and locks the seat striker 213.

The detailed design of the back door lock 232 and the seat lock 215 is best seen in FIG. 8. The invention is, of course, not limited to the particular arrangement shown in this figure.

As shown in FIG. 8, the back door lock 232 is equipped with a switch 231. The switch 231 detects engagement between the striker 232*a* and the back door lock 232 and changes mode during such engagement. A release lever 232*b* and a lock lever 232*f* are also provided. An electrically-operated actuator 233 positions the back door lock in a lock or unlock position. The release lever 232*b* is mechanically coupled, for example, by a cable or a direct connection, to an opener handle 230*a*, and actuates the release system.

When the actuator 233 is in the lock position, pulling the opener handle 230*a* will not open the back door. On the other hand, when the actuator 233 is in the unlock position, pulling the opener handle 230*a* will open the back door. Many different mechanisms can accomplish these functions. In the FIG. 8 design, when the lock lever 232*f* is in the unlock position, a pin 232*e* ensures that movement of the release lever 232*b* is imparted to movement of another lever 232*c* (which opens the lock). When the lock lever 232*f* is in the lock position, the pin 232*e* slides in a slot 232*d* such that movement of the release lever 232*b* does not result in movement of lever 232*c*.

Thus, in the lock condition, the back door cannot be released, but in the unlock condition the back door can be released.

As shown in FIG. 8, the seat lock 215 is equipped with a cancel lever 215a and a release lever 215b. The seat lock 215 also has a switch 217. The switch 217 detects engagement of striker 213 (shown in FIGS. 6 and 7) with the seat lock 215 and changes mode (sends out a different signal) when the striker is engaged. An electrically-operated actuator 219 is provided to position the seat lock in either a lock or an unlock position. The actuator is controlled by a switch (not shown). When the actuator 219 is in the unlock position, when the release lever 215b is pulled, the release lever 215b and a lever 215c (which moves to release the striker 213 from the seat lock 215) move together via an arrangement of slots 215d and pin 215e to release the seat and allow the seat to be positioned in the seating position. When the actuator 219 is in the lock position, pulling the release lever 215b does not result in movement of lever 215c, and thus the rear seat back 212 cannot be positioned in the normal seating position.

An example of operation of the system of the first embodiment will now be described.

When the rear seat bottom 214 is raised forward and the rear seat back 212 is folded down, the seat lock 215 and the striker 213 engage. When the seat lock 215 and the striker 213 engage, switch 217 sends an electrical signal to actuator 233 to cause actuator 233 to move lock lever 232f to the unlock position. This permits opening the back door by pulling the opener handle 230a (which in turn pulls release lever 232b, which in turn moves lever 232c).

When the back door lock 232 disengages, switch 231 sends out an electrical signal to actuator 219 which causes the actuator 219 to move cancel lever 215a to the lock position. Once the cancel lever 215a is in the lock position, operation of release lever 215b does not disengage the seat lock 215.

Thus, with the back door open the rear seat remains in the position shown in FIG. 7, ensuring that no one can be seated in the rear seat with the back door open.

When the back door lock 232 engages, switch 231 sends out an electrical signal (or changes state) to actuator 219 to cause actuator 219 to move cancel lever 215a to the unlock position. Once cancel lever 215a is in the unlock position, operation of release lever 215b disengages seat lock 215, which allows the seat to be returned to the normal seating position shown in FIG. 6.

When seat lock 215 disengages, switch 219 sends out a signal (or changes state) to actuator 233 to cause actuator 233 to move lock lever 232f to the lock position. When lock lever 232f is in the lock position, the back door cannot be opened by pulling handle 230a.

This means that the back door cannot be opened when someone is able to be seated in the rear seat.

FIGS. 9 and 10 show a second embodiment. FIGS. 9 and 10 show an arrangement similar to that in FIGS. 6 and 7 except that in FIGS. 9 and 10, a striker 313 and a lock 315 engage when the rear seat is in a seating position. This arrangement mechanically prevents opening of the back door 330 except when the rear seat bottom 314 and rear seat back 312 are positioned in the non-seating position. Thus, this embodiment (like the first embodiment) provides an interlock to ensure that the back door cannot be opened when the rear seat is in a seating position. These figures also show hatch glass 334, hatch glass lock 336, and hatch glass striker 338. Locks 315 and 336 can be mechanically (for example, using an arrangement of locks and levers) or electronically (for example, using an arrangement of locks, levers, switches, actuators and associated control circuitry) coupled to one another to ensure that the hatch glass cannot open when the seat is in the seating position.

Figure 11:
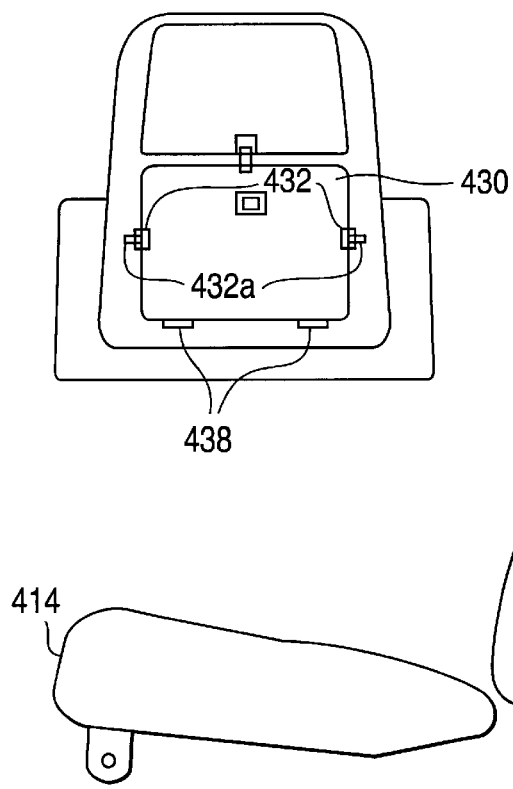
FIGS. 11 to 13 illustrate a third embodiment of the invention.
Figure 12:
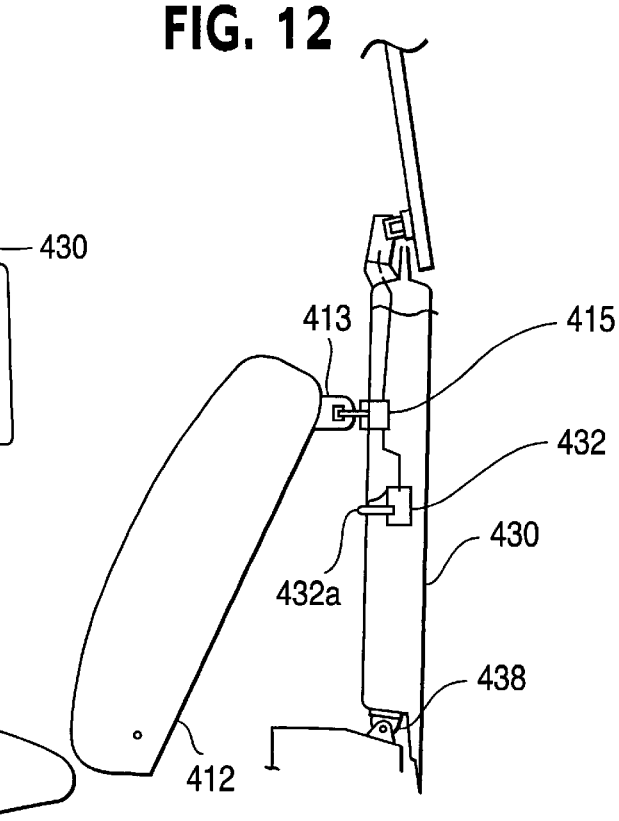
Figure 13:
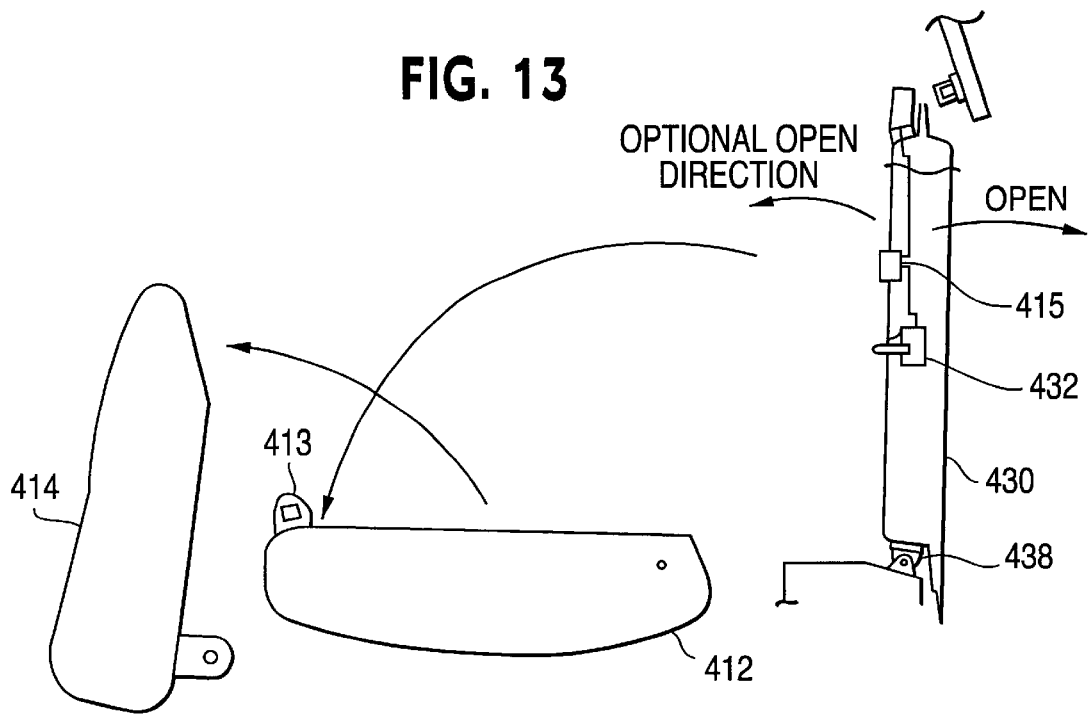

FIGS. 11 to 13 show a third embodiment. In this embodiment, back door 430 is supported by back door hinges 438 such that the back door can open in the forward or backward direction. In this embodiment, when the rear seat bottom 414 and the rear seat back 412 are in a seating position as shown in FIG. 12, a lock 415 (which is in contact with a striker 413) sends an electrical signal to a back door lock 432 such that the back door lock 432 and striker 432a prevent the back door 430 from being opened.

FIG. 14 shows a fourth embodiment wherein an actuator 516 is provided to release a seat lock 515. In this design, a switch 515b is used to disengage the seat lock instead of a mechanical release lever. In this embodiment, the electrical circuits associated with switch 515b prevent releasing the seat lock while the back door is open. Thus, this embodiment provides the same features as, for example, the first embodiment.

Also, this fourth embodiment provides direct operation of a release lever 532b instead of using an opener handle. FIG. 14 also depicts switch 517, switch 531, back door lock 532, lock lever 532a, and actuator 533.

FIGS. 15A to 15I show examples of vehicle arrangements which can employ the invention. The circles show hinge locations. The arrangements of FIGS. 15A, 15C and 15G may employ, for example, an arrangement similar to the first embodiment. The arrangement of FIG. 15B may employ, for example, an arrangement similar to the second embodiment. The arrangements of FIGS. 15D, 15E, 15F, 15H, and 15I may employ, for example, arrangements similar to the third embodiment.

The invention is not limited to the specific examples of the invention set forth above. Variations and modifications of the examples set forth above will occur to those in the field. For example, mounting positions for the locks and strikers can be varied. Such variations and modifications are within the spirit and scope of the invention. Accordingly, the invention is defined with reference to the following claims.

We claim:

1. A vehicle, comprising:

a cab having a front seat and a rear seat;

a cargo area behind the cab;

a back door between the cab and the cargo area; and a first interlock, which senses whether the rear seat is in a seating position, and which prevents the back door from being opened when the rear seat is in a seating position.

2. A vehicle as set forth in claim 1, further comprising:

a second interlock, connectable to the rear seat, which prevents the rear seat from being placed in the seating position while the back door is opened.

3. A vehicle as set forth in claim 1, wherein the first interlock comprises:

a back door lock which locks the back door when the rear seat is in a seating position.

4. A vehicle as set forth in claim 2, wherein the second interlock comprises:

a seat lock which locks the rear seat in a non-seating position when the back door is opened.

5. A vehicle as set forth in claim 1, wherein the first interlock comprises:

a lock which locks the back door and the rear seat when the rear seat is in a seating position.

6. A vehicle as set forth in claim 5, wherein said lock generates an electrical signal for a back door lock.

7. An interlock system for a vehicle having a cab with a front seat and a rear seat, a cargo area behind the cab, and a back door between the cab and the cargo area, the interlock system comprising:

an interlock, which senses whether the rear seat is in a seating position, and which prevents the back door from being opened when the rear seat is in a seating position.

8. An interlock system as set forth in claim 7, further comprising:

a second interlock, connectable to the rear seat, which prevents the rear seat from being placed in a seating position while the back door is opened.

* * * * *

UNITED STATES PATENT AND TRADEMARK OFFICE
CERTIFICATE OF CORRECTION

PATENT NO. : 6,276,751 B1
DATED : August 21, 2001
INVENTOR(S) : Yoshiaki Ikarashi et al.

It is certified that error appears in the above-identified patent and that said Letters Patent is hereby corrected as shown below:

<u>Title page,</u>
Inventors' Names should read as follows:
-- [75] Inventors: Yoshiaki Ikarashi, West Bloomfield, MI (US);
                     Masazumi Miyagawa, Naka-ku (JP) --

Signed and Sealed this

Twenty-eighth Day of May, 2002

*Attest:*

JAMES E. ROGAN
*Attesting Officer*     *Director of the United States Patent and Trademark Office*